United States Patent
Jiang

(10) Patent No.: US 11,256,536 B2
(45) Date of Patent: Feb. 22, 2022

(54) METHOD AND SYSTEM FOR PROCESSING TRANSACTIONS USING A TRANSACTION COORDINATOR

(71) Applicant: Alibaba Group Holding Limited, George Town (KY)

(72) Inventor: Yu Jiang, Beijing (CN)

(73) Assignee: Alibaba Group Holding Limited

(*) Notice: Subject to any disclaimer, the term of this patent is extended or adjusted under 35 U.S.C. 154(b) by 0 days.

(21) Appl. No.: 16/802,186

(22) Filed: Feb. 26, 2020

(65) Prior Publication Data

US 2020/0264916 A1 Aug. 20, 2020

Related U.S. Application Data

(63) Continuation-in-part of application No. PCT/CN2018/102495, filed on Aug. 27, 2018.

(51) Int. Cl.
*G06F 9/46* (2006.01)

(52) U.S. Cl.
CPC ........... *G06F 9/466* (2013.01); *G06F 9/461* (2013.01)

(58) Field of Classification Search
None
See application file for complete search history.

(56) References Cited

U.S. PATENT DOCUMENTS

| | | | |
|---|---|---|---|
| 6,928,290 B2 | 8/2005 | Byers | |
| 8,370,427 B2 | 2/2013 | Zhu | |
| 10,382,909 B2 | 8/2019 | Laumen | |
| 2004/0088717 A1* | 5/2004 | Chen | G06F 16/27 719/321 |
| 2005/0144301 A1* | 6/2005 | Park | H04L 67/2819 709/230 |
| 2006/0149791 A1* | 7/2006 | Sinha | G06F 9/466 |
| 2009/0327133 A1* | 12/2009 | Aharoni | G06Q 20/12 705/44 |
| 2011/0041006 A1* | 2/2011 | Fowler | G06F 9/5072 714/10 |
| 2011/0087709 A1* | 4/2011 | Sriram | G06F 16/2365 707/803 |
| 2014/0172955 A1* | 6/2014 | Holla | G06F 8/60 709/203 |
| 2017/0337532 A1* | 11/2017 | Choi | G06Q 20/102 |
| 2018/0107703 A1* | 4/2018 | Sharp | G06F 16/2379 |
| 2018/0349430 A1* | 12/2018 | Lee | G06F 16/28 |

FOREIGN PATENT DOCUMENTS

| | | |
|---|---|---|
| CN | 106255956 | 12/2016 |
| CN | 106776076 | 5/2017 |

* cited by examiner

*Primary Examiner* — Meng Ai T An
*Assistant Examiner* — Jujia Xu
(74) *Attorney, Agent, or Firm* — Van Pelt, Yi & James LLP

(57) ABSTRACT

Processing a transaction is disclosed including receiving a global transaction start request sent by a message sending terminal, the global transaction start request instructing that a message link-level transaction be started, assigning a unique transaction identifier to the message link-level transaction, and sending a global transaction ID to the message sending terminal, the global transaction ID including the unique transaction ID and an address of a transaction coordinator configured to coordinate the message link-level transaction.

10 Claims, 11 Drawing Sheets

300

400

700

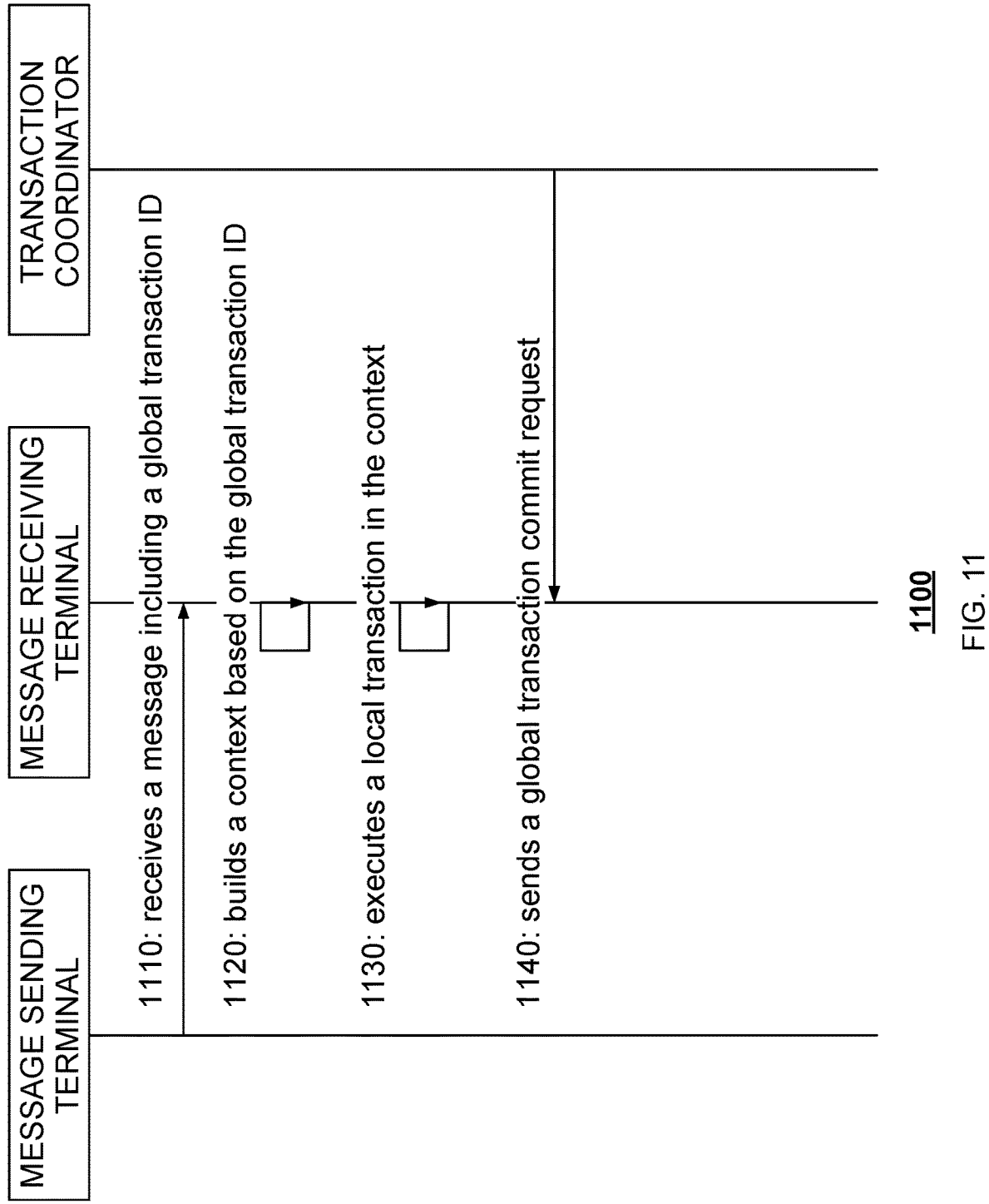

METHOD AND SYSTEM FOR PROCESSING TRANSACTIONS USING A TRANSACTION COORDINATOR

CROSS REFERENCE TO OTHER APPLICATIONS

This application is a continuation-in-part of and claims priority to International (PCT) Application No. PCT/CN2018/102495, entitled TRANSACTION PROCESSING METHOD, APPARATUS, AND SYSTEM, AND ELECTRONIC DEVICE filed on Aug. 27, 2018, which is incorporated herein by reference in its entirety for all purposes, which claims priority to China Patent Application No. 201710792273.8, entitled TRANSACTION PROCESSING METHOD, MEANS AND SYSTEM AND ELECTRONIC DEVICE filed on Sep. 5, 2017 which is incorporated by reference in its entirety for all purposes.

FIELD OF THE INVENTION

The present invention relates to a method and a system for processing transactions.

BACKGROUND OF THE INVENTION

In the computing field, a "transaction" refers to a program execution technique involving accessing and possibly updating various data items in a database. A "message link-level transaction" refers to a local transaction involving multiple databases on a single transaction link, which includes a message sending terminal and a message receiving terminal.

To ensure data consistency of a multi-database local transaction on a message link, a transactional message technique is typically adopted. In other words, message-oriented middleware is set up between the message sending terminal and the message receiving terminal. This message-oriented middleware is configured to store messages sent by the message sending terminal. Also, only after a local transaction is successfully committed in the database by the message sending terminal, the message stored in the message-oriented middleware becomes visible to the message receiving terminal. The message receiving terminal receives the message and executes the local transaction only after the message becomes visible.

This transactional message technique ensures that the local transaction of the sending terminal and the sending of the message simultaneously succeed or simultaneously fail. Only after the local transaction of the message sending terminal is successfully committed is the message receiving terminal capable of receiving the message sent by the sending terminal and then executing the local transaction according to the message.

However, the transactional message technique includes at least the following limitations: the local transaction of the message receiving terminal cannot be ensured to succeed after the local transaction of the message sending terminal has been successfully committed in the database and the message has been successfully sent. To ensure that data of the message sending terminal is consistent with data of the message receiving terminal, the local transaction of the message receiving terminal is, in the event that the local transaction of the message receiving terminal fails, to be continually retried until the local transaction succeeds. This continual retrying is called eventual consistency. However, in the event that the local transaction of the message receiving terminal continually retries unsuccessfully, data consistency is to be affected, requiring manual intervention. As a result, development, operations, and maintenance are impacted.

SUMMARY OF THE INVENTION

The present invention provides a method, a system, and an electronic device for processing transactions to improve eventual consistency and lower the costs of development, operations, and maintenance while achieving data consistency in message link-level transactions.

An embodiment of a system for processing transactions comprises: a message sending terminal and a message receiving terminal of a message link, and a transaction coordinator used to coordinate a message link-level transaction; the message sending terminal is configured to: send a global transaction start request to the transaction coordinator, the global transaction start request instructing that the message link-level transaction be started; receive a global transaction identifier (ID) sent back by the transaction coordinator, the global transaction ID including a unique transaction ID assigned to the message link-level transaction and an address of the transaction coordinator used to coordinate the message link-level transaction; build a context based on the global transaction ID; execute a local transaction in the context; and send a message to the message receiving terminal after completing execution of the local transaction, the message including the global transaction ID; the message receiving terminal configured to: receive, from the message sending terminal, the message including the global transaction ID; build a context based on the global transaction ID; execute a local transaction in the context; and send a global transaction commit request to the transaction coordinator after completing execution of the local transaction, the global transaction commit request configured to instruct that the message link-level transaction be committed; and the transaction coordinator configured to: receive the global transaction start request sent by the message sending terminal; assign a unique transaction ID to the message link-level transaction; send back a global transaction ID to the message sending terminal; receive the global transaction commit request sent by the message receiving terminal; and commit the message link-level transaction to servers of the message sending terminal and the message receiving terminal, respectively.

An embodiment of a process for processing transactions comprises: receiving a global transaction start request sent by a message sending terminal, the global transaction start request instructing that a message link-level transaction be started; assigning a unique identifier (ID) to the message link-level transaction; and sending back a global transaction ID to the message sending terminal, the global transaction ID comprising a unique transaction ID and an address of a transaction coordinator used to coordinate the message link-level transaction.

Another embodiment of a process for processing transactions comprises: sending a global transaction start request to a transaction coordinator, the global transaction start request instructing that a message link-level transaction be started; receiving a global transaction identifier (ID) sent back by the transaction coordinator, the global transaction ID including a unique transaction ID assigned to the message link-level transaction and an address of the transaction coordinator configured to coordinate the message link-level transaction; building a context based on the global transaction ID; executing a local transaction in the context; and sending a message to a message receiving terminal after completing execution of the local transaction, the message including the global transaction ID.

Yet another embodiment of a process for processing transactions comprises: receiving a message including a global transaction identifier (ID) from a message sending terminal, the global transaction ID including a unique transaction ID assigned to a message link-level transaction and an address of a transaction coordinator configured to coordinate the message link-level transaction; building a context based on the global transaction ID; executing a local transaction in the context; and sending a global transaction commit request to the transaction coordinator after completing execution of the local transaction, the global transaction commit request instructing that the message link-level transaction be committed.

An embodiment of a device for processing transactions comprises: a first receiving module configured to receive a global transaction start request sent by a message sending terminal, the global transaction start request instructing that the message link-level transaction be started; an assigning module configured to assign a unique identifier (ID) to the message link-level transaction; and a first sending module configured to send back a global transaction ID to the message sending terminal, the global transaction ID including the unique transaction ID and an address of the transaction coordinator configured to coordinate the message link-level transaction.

Another embodiment of a device for processing transactions comprises: a second sending module configured to send a global transaction start request to a transaction coordinator, the global transaction start request instructing that the message link-level transaction be started; a third receiving module configured to receive a global transaction identifier (ID) sent back by the transaction coordinator, the global transaction ID including a unique transaction ID assigned to the message link-level transaction and an address of the transaction coordinator configured to coordinate the message link-level transaction; a first executing module configured to: build a context based on the global transaction ID, and execute a local transaction in the context; and a third sending module configured to send a message to a message receiving terminal after completing execution of the local transaction, the message including the global transaction ID.

Yet another embodiment of a device for processing transactions comprises: a fourth receiving module configured to receive a message including a global transaction ID from a message sending terminal, the global transaction identifier (ID) including a unique transaction ID assigned to a message link-level transaction and an address of a transaction coordinator configured to coordinate the message link-level transaction; and a second executing module configured to: build a context based on the global transaction ID, and execute a local transaction in the context; and a fourth sending module configured to send a global transaction commit request to the transaction coordinator after the second executing module completes execution of the local transaction, the global transaction commit request instructing that the message link-level transaction be committed.

An embodiment of a system for processing transactions comprises: a memory configured to store programs; and a processor configured to: execute the programs stored in the memory, the programs being configured to: receive a global transaction start request sent by a message sending terminal, the global transaction start request instructing that a message link-level transaction be started; assign a unique transaction identifier (ID) to the message link-level transaction; and send back a global transaction ID to the message sending terminal, the global transaction ID including the unique transaction ID and an address of a transaction coordinator configured to coordinate the message link-level transaction.

Another embodiment of a system for processing transactions comprises: a memory configured to: store programs; and a processor configured to: execute the programs stored in the memory, the programs being configured to: send a global transaction start request to a transaction coordinator, the global transaction start request instructing that a message link-level transaction be started; receive a global transaction identifier (ID) sent back by the transaction coordinator, the global transaction ID including a unique transaction ID assigned to the message link-level transaction and an address of the transaction coordinator configured to coordinate the message link-level transaction; build a context based on said global transaction ID; execute a local transaction in the context; and send a message to a message receiving terminal after completing execution of the local transaction, the message including the global transaction ID.

Yet another embodiment of a system for processing transactions comprises: a memory configured to store programs; and a processor configured to: execute the programs stored in the memory, the programs being configured to: receive a message including a global transaction identifier (ID) from a message sending terminal, the global transaction ID including a unique transaction ID assigned to a message link-level transaction and an address of a transaction coordinator configured to coordinate the message link-level transaction; build a context based on the global transaction ID; execute a local transaction in the context; and send a global transaction commit request to the transaction coordinator after completing execution of the local transaction, the global transaction commit request instructing that the message link-level transaction be committed.

The process, the system, and the device for processing transactions process a local transaction at each terminal of a message link as a single global transaction by including a global transaction ID in the message and thus automatically propagating a context, thereby ensuring data consistency over the entire message link, avoiding unnecessary manual intervention, and lowering the costs of development, operations, and maintenance.

BRIEF DESCRIPTION OF THE DRAWINGS

Various embodiments of the invention are disclosed in the following detailed description and the accompanying drawings.

By reading the following detailed descriptions of preferred embodiments, persons having ordinary skill in the art will gain a clear understanding of other advantages and benefits. The attached drawings merely serve to depict the objectives of preferred embodiments and are not to be understood as limiting the present application. Moreover, the same symbols are used to refer to the same components throughout the drawings. Among the drawings:

FIG. 11 is a data flow diagram of yet another embodiment of a process for processing transactions.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

To address eventual consistency issues associated with conventional transaction processing, the present application provides at least the following: a transaction coordinator is set up to coordinate all of the participants (terminals) throughout a message link-level transaction; a local transaction is processed at each terminal of a message link as a single global transaction by including a global transaction identifier (ID) in the message, and thus automatically propagating a context, thereby ensuring data consistency, while avoiding unnecessary manual intervention and lowering the costs of development, operations, and maintenance.

Figure 1:
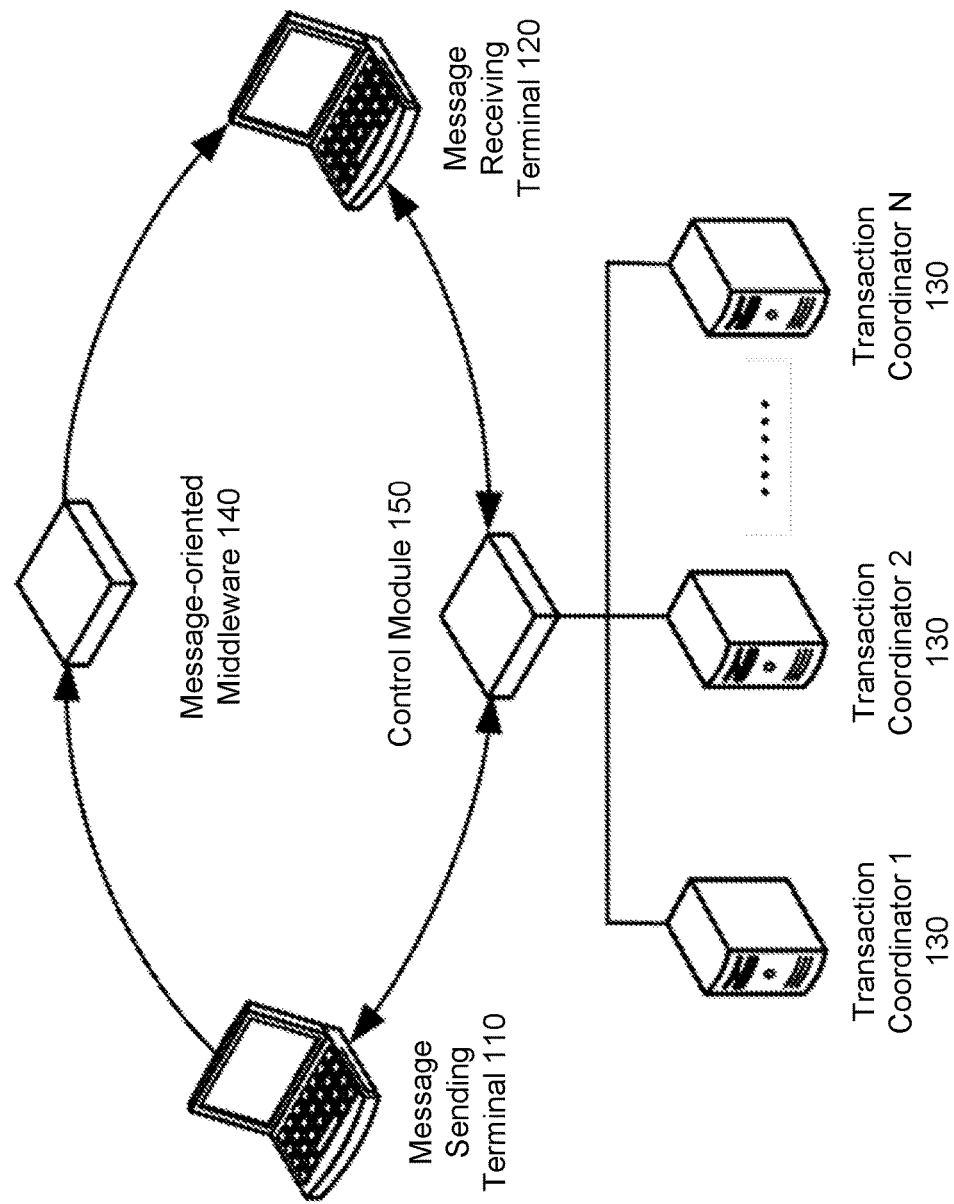
FIG. 1 is a scenario diagram of an embodiment of a system for processing transactions.

FIG. 1 is a scenario diagram of an embodiment of a system for processing transactions. The system 100 can be applied to an operations system that processes message link-level transactions. The system 100 provides one example of a system that can be applied to an operations scenario. As shown in FIG. 1, the system 100 comprises: a message sending terminal 110 and a message receiving terminal 120 of a message link and transaction coordinators 130 used to coordinate message link-level transactions. The transaction coordinators 130 can be used to execute the processing of the transaction process shown in FIG. 2. In some embodiments, the transaction coordinators 130 receive a global transaction start request sent by a message sending terminal, assign a unique transaction ID to the message link-level transaction, send back a global transaction ID to the message sending terminal, receive a global transaction commit request sent by the message receiving terminal, and commit the message link-level transaction to servers (not shown) of the message sending terminal and the message receiving terminal, respectively (storing data generated by the local transaction in the respective databases (not shown)). The message sending terminal can execute the processing process shown in FIG. 3. The process of FIG. 3 comprises: sending a global transaction start request to a transaction coordinator, the global transaction start request instructing that the message link-level transaction be started; receiving a global transaction identifier (ID) sent back by the transaction coordinator, the global transaction ID including a unique transaction ID assigned to the message link-level transaction and an address (e.g., IP address, port number, etc.) of the transaction coordinator configured to coordinate the message link-level transaction; building a context based on the global transaction ID; executing a local transaction in the context; and sending a message to a message receiving terminal after completing execution of the local transaction, the message including the global transaction ID. The message receiving terminal can execute the processing process shown in FIG. 4. The process of FIG. 4 comprises: receiving, from a message sending terminal, a message including a global transaction identifier (ID); building a context based on the global transaction ID; executing a local transaction in the context; and sending a global transaction commit request to a transaction coordinator after completing execution of the local transaction, the global transaction commit request instructing that the message link-level transaction be committed.

In some embodiments, the system for processing transactions further includes a message-oriented middleware 140. The message-oriented middleware 140 can be configured to: receive and store a message sent by the message sending terminal 110. Upon receiving a request for the message sent by the message receiving terminal 120, the message-oriented middleware 140 can send the stored message to the message receiving terminal 120.

Furthermore, the system 100 can include a plurality of terminals on a message link. For example, the system 100 also includes one or more message intermediate terminals (not shown in the drawing) in addition to the message sending terminal 110 and the message receiving terminal 120. In some embodiments, the middleware 140 operates on a terminal separate from the message intermediate terminals. The message intermediate terminals of the message link each can receive messages and send messages (i.e., the message link is: message sending terminal→message intermediate terminal→message receiving terminal). The message intermediate terminal can be configured to: receive a first message including a global transaction identifier (ID) from the message-oriented middleware; build a context based on the global transaction ID; execute a local transaction in the context; and send a second message to the message-oriented middleware after completing execution of the local transaction, the second message including the global transaction ID.

Furthermore, the system 100 can include a plurality of transaction coordinators 130 (transaction coordinator 1, transaction coordinator 2, ..., transaction coordinator n), in which the system further comprises: a control module 150. The control module 150 can be configured to: receive a global transaction start request sent by the message sending terminal 110, assign a transaction coordinator 130 to the message link-level transaction, and forward the global transaction start request to the transaction coordinator.

In some embodiments, the message sending terminal 110 or the message receiving terminal 120 is further configured to: send a global transaction roll-back request to the transaction coordinator 130 in the event that execution of the local transaction fails. The global transaction roll-back request can be used to roll back the message link-level transaction. In this case, the transaction coordinator 130 is further configured to: send a global transaction roll-back request to servers of the message sending terminal and the message receiving terminal, respectively, upon receiving the global transaction roll-back request from the message sending terminal 110 or the message receiving terminal 120. In the event that the execution of the local transaction fails, the message intermediate terminal can be further configured to: send a global transaction roll-back request to the transaction coordinator. The global transaction roll-back request can be used to roll back the message link-level transaction. In this case, the transaction coordinator is further configured to send the global transaction roll-back request to servers of the message sending terminal 110, the message receiving terminal 120, and the message intermediate terminal, respectively, upon receiving a global transaction roll-back request sent by the message sending terminal 110, the message receiving terminal 120, or the message intermediate terminal. In other words, in the event that the execution of a local transaction by any terminal of a message link-level transaction (e.g., a message sending terminal 110, a message receiving terminal 120, or a message intermediate terminal) fails, the terminal sends a global transaction roll-back request to the transaction coordinator 130. The transaction coordinator 130 sends the global transaction roll-back request to all servers participating in the global transaction (the message link-level transaction). These servers can include the servers of the message sending terminal 110, the message receiving terminal 120, and the message intermediate terminal. As a result, each server rolls back to the status prior to the start of the message link-level transaction.

The system 100 can process a local transaction at each terminal of a message link as a single global transaction by including a global transaction ID in the message, and thus automatically propagate a context. In the event that one of the terminals fails, the system 100 rolls back the global transaction: the transaction of each terminal is rolled back to the status prior to the transaction. The rolling back of the global transaction can ensure data consistency over the entire link, avoid unnecessary manual intervention, and lower the costs of development, operations, and maintenance.

Figure 2:
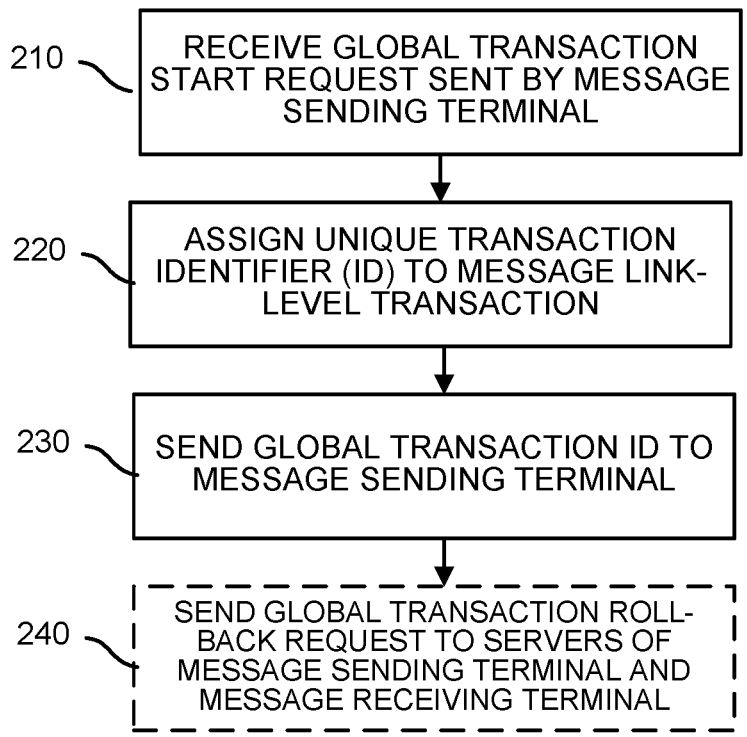
FIG. 2 is a flowchart of an embodiment of a process for processing transactions.

FIG. 2 is a flowchart of an embodiment of a process for processing transactions. In some embodiments, the process 200 is implemented by a transaction coordinator 130 of FIG. 1 and comprises:

In 210, the transaction coordinator receives a global transaction start request sent by a message sending terminal. The global transaction start request can instruct that a message link-level transaction is to be started.

In 220, the transaction coordinator assigns a unique transaction identifier (ID) to the message link-level transaction.

In the event that the message sending terminal begins a transaction, the message sending terminal first sends a global transaction start request to the transaction coordinator. After the transaction coordinator receives the request, the transaction coordinator assigns a unique transaction ID to the message link-level transaction to differentiate the message link-level transaction from other transactions.

In 230, the transaction coordinator sends the global transaction ID to the message sending terminal. The global transaction ID includes the unique transaction ID and an address of the transaction coordinator configured to coordinate the message link-level transaction. The address of the transaction coordinator can include an IP address, a port number, etc.

The unique transaction ID and the address (e.g., IP address, port number, etc.) of the transaction coordinator configured to coordinate the message link-level transaction can be combined to form the global transaction ID (XID), and the XID can be sent back to the message sending terminal. The receiving of the XID can cause the message sending terminal to build a context based on the XID and execute a local transaction in the context. The context is understood by one of ordinary skill in the art and will not be further explained for conciseness. The context can include information to identify the specific transaction. In the context, a resource manager for the message sending terminal performs operations on the local database and, interacting with the transaction coordinator based on information in the context, is coordinated by the transaction coordinator. After completing the local transactions, the message sending terminal can add the XID to a header of a message to be sent and then send the message to the message receiving terminal. The message receiving terminal can re-build the context based on the XID included in the received message and execute a local transaction in the same context. A resource manager of the message receiving terminal performs operations on the local database. After completing execution of the local transaction, the message receiving terminal sends a global transaction commit request to the transaction coordinator. In the event that the transaction coordinator receives the global transaction commit request sent by the message receiving terminal, the transaction coordinator commits the message link-level transaction to servers of the message sending terminal and the message receiving terminal, respectively. The message sending terminal or the message receiving terminal can send a global transaction roll-back request to the transaction coordinator in the event that the execution of the local transaction fails. The transaction coordinator sends a global transaction roll-back request to the servers of the message sending terminal and the message receiving terminal, respectively, upon receiving the global transaction roll-back request from the message sending terminal or the message receiving terminal. As a result, each server rolls back to the status prior to the start of the message link-level transaction.

In 240, optionally, in the event that the transaction fails on any terminal, the transaction coordinator sends a global transaction roll-back request to servers of the message sending terminal and the message receiving terminal, so that the transaction of each terminal is rolled back to the status prior to the transaction.

The process 200 processes a local transaction at each terminal of a message link as a single global transaction by including a global transaction ID in the message and thus automatically propagating a context. In the event that the transaction fails on any terminal, the process 200 rolls back the global transaction, and the transaction of each terminal is rolled back to the status prior to the transaction, thereby ensuring data consistency over the entire link, avoiding unnecessary manual intervention, and lowering the costs of development, operations, and maintenance.

Figure 3:
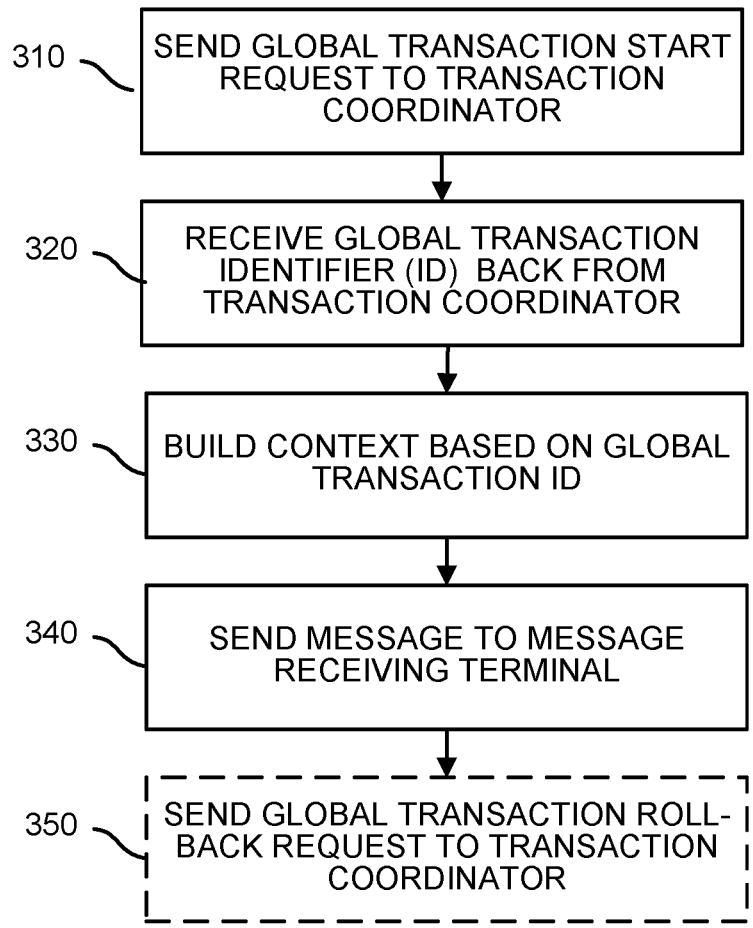
FIG. 3 is a flowchart of another embodiment of a process for processing transactions.

FIG. 3 is a flowchart of another embodiment of a process for processing transactions. In some embodiments, the process 300 is implemented by a message sending terminal 110 of FIG. 1, and comprises:

In 310, the message sending terminal sends a global transaction start request to a transaction coordinator. In some embodiments, the global transaction start request instructs that a message link-level transaction is to be started.

In the event that the message sending terminal begins a transaction, the message sending terminal can first send a global transaction start request to the transaction coordinator. As an example, a plurality of transaction coordinators exists, and the sending of the global transaction start request includes: sending the global transaction start request to a control module. The control module can assign a transaction coordinator to the message link-level transaction and forward the global transaction start request to the transaction coordinator.

In 320, the message sending terminal receives a global transaction identifier (ID) back from the transaction coordinator. In some embodiments, the global transaction ID includes a unique transaction ID assigned to the message link-level transaction and an address of the transaction coordinator configured to coordinate the message link-level transaction. The address of the transaction coordinator can include an IP address, a port number, etc.

In 330, the message sending terminal builds a context based on the global transaction ID, and executes a local transaction in the context. For example, a context can be set as an object that has the value of the global transaction ID (e.g., contextObject.v=global_transaction_ID).

In some embodiments, the message sending terminal builds a context based on the global transaction ID, and executes the local transaction in the context. In the context, a resource manager for the message sending terminal performs operations on the local database and, interacting with the transaction coordinator based on information in the context, is coordinated by the transaction coordinator.

In 340, after executing the local transaction, the message sending terminal sends a message to the message receiving terminal. The message includes the global transaction ID.

In some embodiments, after completing the local transaction, the message sending terminal adds the global transaction ID to a header of the message to be sent and then sends the message to the message receiving terminal. As an example, the sending of the message to the message receiving terminal also includes sending, by the message sending terminal, a message to message-oriented middleware, and the message-oriented middleware is configured to store and forward the message to the message receiving terminal. The message receiving terminal re-builds the context based on the global transaction ID included in the received message and executes a local transaction in the same context. The resource manager of the message receiving terminal performs operations on the local database.

In 350, optionally, in the event that execution of a local transaction at the message sending terminal fails, the message sending terminal sends a global transaction roll-back request to the transaction coordinator. The transaction coordinator sends the global transaction roll-back request to all servers participating in the global transaction (the message link-level transaction). These servers can include the servers of the message sending terminal, the message receiving terminal, and a message intermediate terminal (in the event that the message intermediate terminal exists in the message link-level transaction). As a result, each server rolls back to the status prior to the start of the message link-level transaction.

The process 300 processes a local transaction at each terminal of a message link as a single global transaction by including a global transaction ID in the message and thus automatically propagating a context. In the event that the transaction fails on any terminal on the message link, the process 300 rolls back the global transaction, and the transaction of each terminal is rolled back to the status prior to the transaction, thereby ensuring data consistency over the entire message link, avoiding unnecessary manual intervention, and lowering the costs of development, operations, and maintenance.

Figure 4:
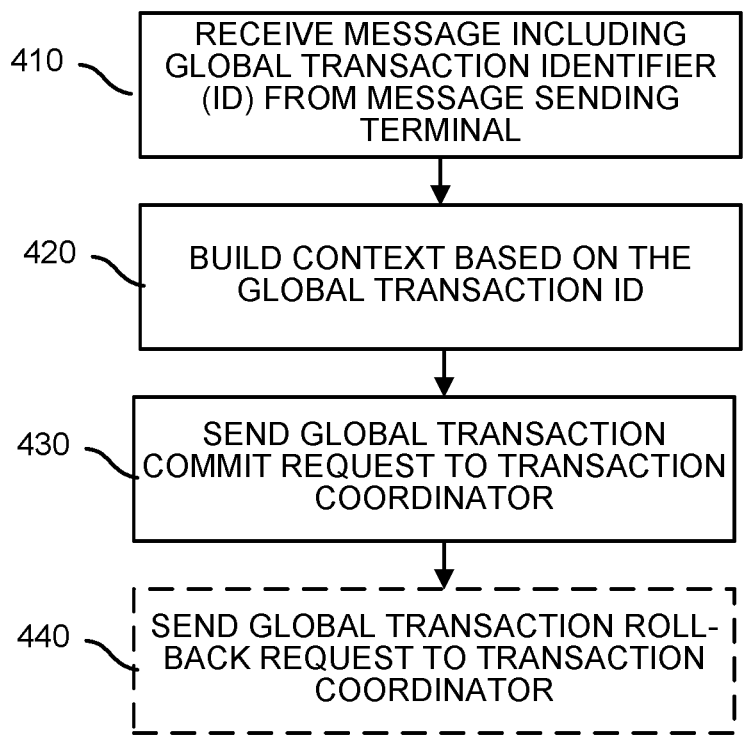
FIG. 4 is a flowchart of yet another embodiment of a process for processing transactions.

FIG. 4 is a flowchart of yet another embodiment of a process for processing transactions. In some embodiments, the process 400 is implemented by a message receiving terminal 120 of FIG. 1, and comprises:

In 410, the message receiving terminal receives a message including a global transaction identifier (ID) from a message sending terminal. The global transaction ID includes a unique transaction ID assigned to a message link-level transaction and an address of the transaction coordinator configured to coordinate the message link-level transaction. The address of the transaction coordinator can include an IP address, a port number, etc.

In some embodiments, after completing the local transaction, the message sending terminal adds the global transaction ID to a header of a message to be sent and then sends the message to the message receiving terminal. As an example, the receiving of the message also includes: sending a message acquisition request to a message-oriented middleware; receiving a message that was stored in the message-oriented middleware and that originated from the message sending terminal and includes the global transaction ID.

In 420, the message receiving terminal builds a context based on the global transaction ID, and executes a local transaction in the context.

In some embodiments, the message receiving terminal re-builds the context based on the global transaction ID included in the received message, and executes a local transaction in the same context. A resource manager of the message receiving terminal performs operations on the local database.

In 430, after completing execution of the local transaction, the message receiving terminal sends a global transaction commit request to a transaction coordinator. The global transaction commit request instructs that a message link-level transaction is to be committed.

After completing execution of the local transaction, the message receiving terminal can send a global transaction commit request to the transaction coordinator. In some embodiments, the global transaction commit request instructs that the message link-level transaction be committed to the servers of the message sending terminal and the message receiving terminal, respectively.

In 440, optionally, in the event that execution of a local transaction at the message receiving terminal fails, the message receiving terminal sends a global transaction roll-back request to the transaction coordinator. The transaction coordinator sends the global transaction roll-back request to all servers participating in the global transaction (message link-level transaction). These servers can include servers of the message sending terminal, the message receiving terminal, and a message intermediate terminal (in the event that the message intermediate terminal is involved in the message link-level transaction). Upon receiving the global transaction roll-back request, each server rolls back to the status prior to the start of the message link-level transaction.

The process 400 can process a local transaction at each terminal of a message link as a single global transaction by including a global transaction ID in the message and thus automatically propagating a context. In the event that the transaction fails on any terminal, the process 400 can roll back the global transaction, and the transaction of each terminal can be rolled back to the status prior to the transaction, thereby ensuring data consistency over the entire link, avoiding unnecessary manual intervention, and lowering the costs of development, operations, and maintenance.

Figure 9:
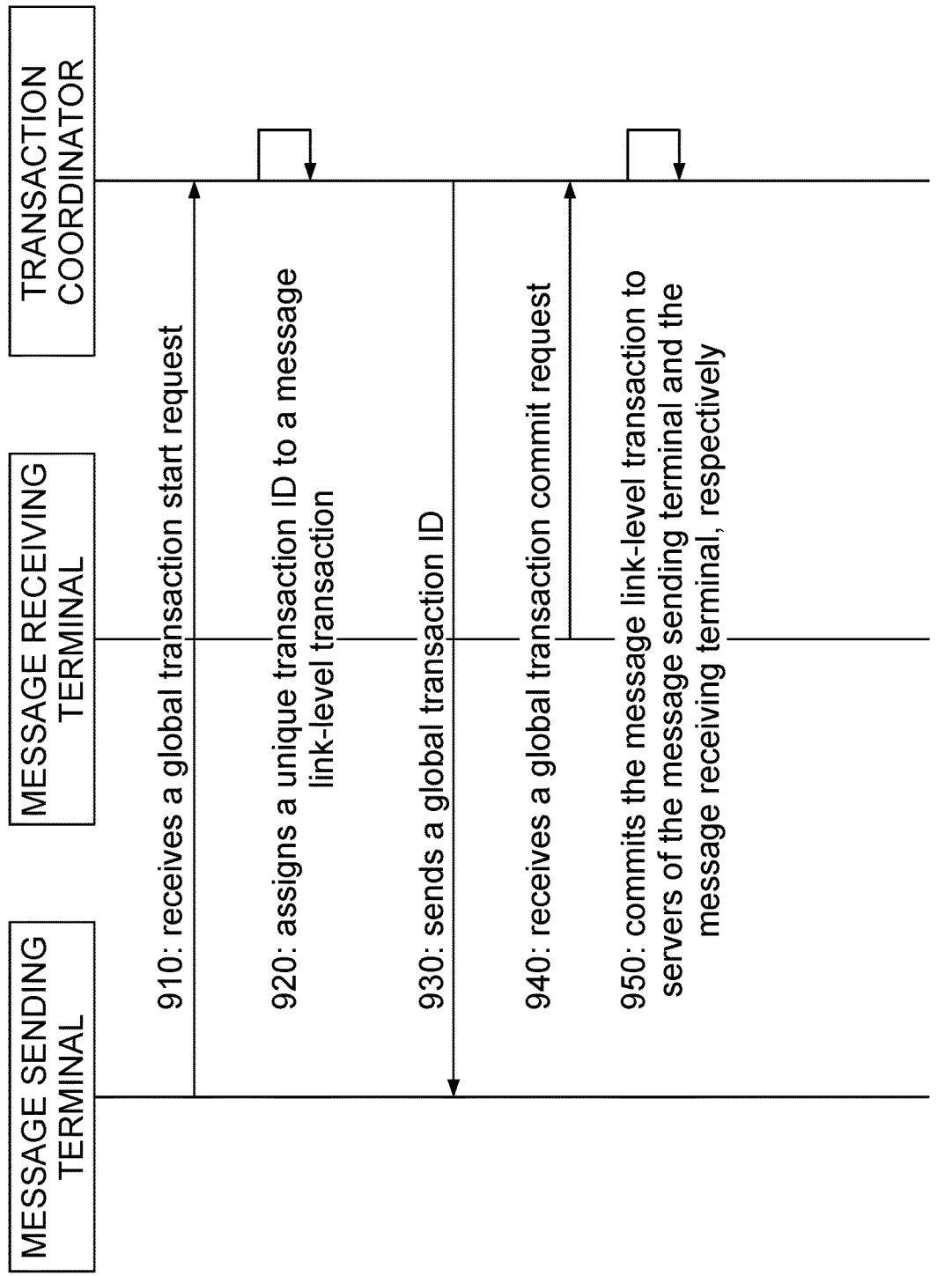
FIG. 9 is a data flow diagram of an embodiment of a system for processing transactions.

FIG. 9 is a data flow diagram of an embodiment of a process for processing transactions. In some embodiments, system 900 comprises: a message sending terminal and a message receiving terminal of a message link and a transaction coordinator used to coordinate message link-level transactions. The transaction coordinator can be used to execute the processing of the transaction process 200 of FIG. 2.

In operation 910, the transaction coordinator receives a global transaction start request sent by a message sending terminal.

In operation 920, the transaction coordinator assigns a unique transaction ID to the message link-level transaction. For example the transaction ID is 123.

In operation 930, the transaction coordinator sends a global transaction ID to the message sending terminal.

In operation 940, the transaction coordinator receives a global transaction commit request sent by the message receiving terminal.

In operation 950, the transaction coordinator commits the message link-level transaction to servers of the message sending terminal and the message receiving terminal, respectively. In some embodiments, data generated by the local transaction can be stored in respective databases.

Figure 10:
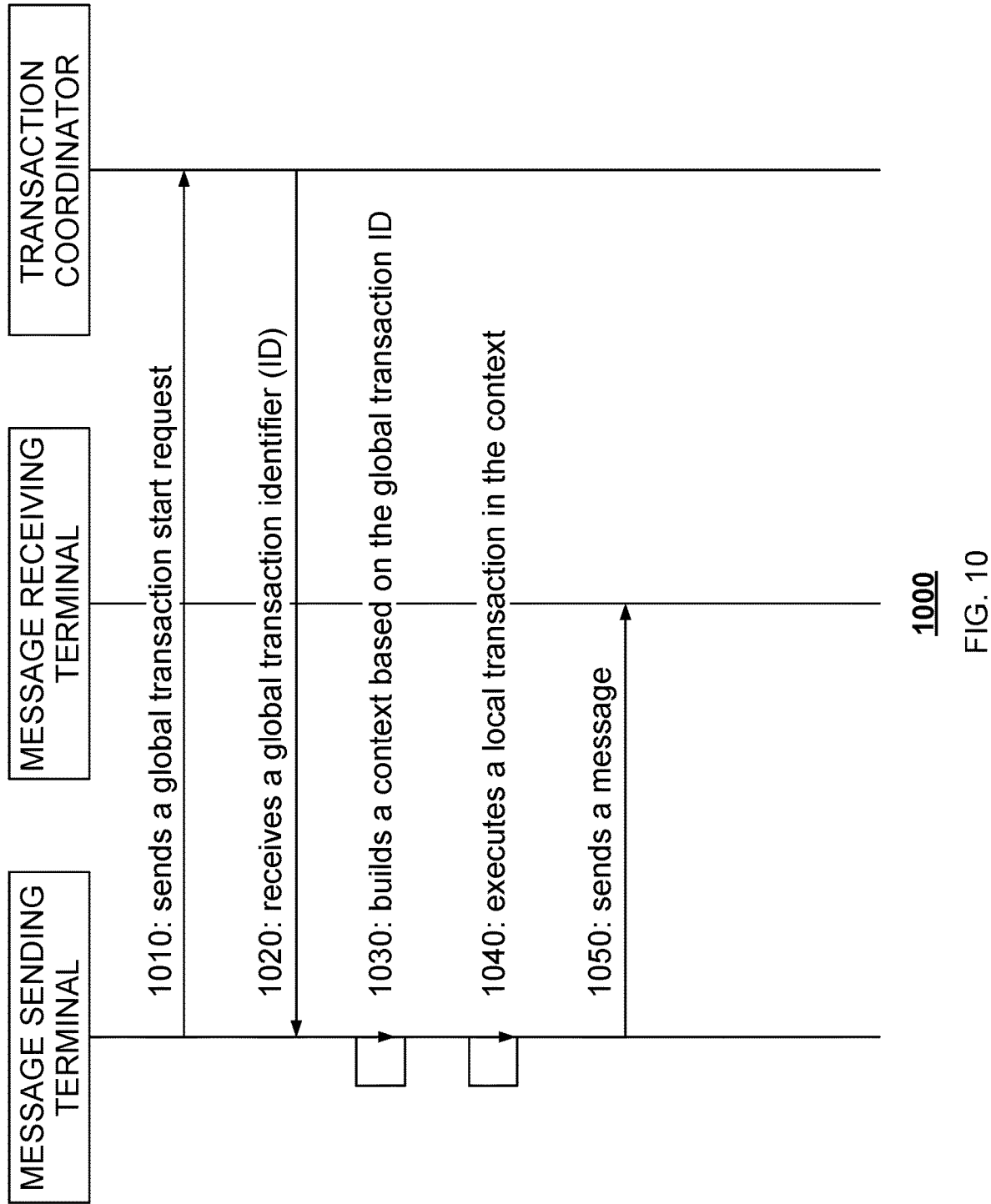
FIG. 10 is a data flow diagram of another embodiment of a process for processing transactions.

FIG. 10 is a data flow diagram of another embodiment of a process for processing transactions. In some embodiments, system 1000 comprises: a message sending terminal and a message receiving terminal of a message link and a transaction coordinator used to coordinate message link-level transactions. The message sending terminal can be used to execute the processing of the transaction process 300 of FIG. 3.

In 1010, the message sending terminal sends a global transaction start request to a transaction coordinator, the global transaction start request instructing that the message link-level transaction be started.

In 1020, the message sending terminal receives a global transaction identifier (ID) sent back by the transaction coordinator, the global transaction ID including a unique transaction ID assigned to the message link-level transaction and an address (e.g., IP address, port number, etc.) of the transaction coordinator configured to coordinate the message link-level transaction. For example the global transaction ID is 321, and the address is 156.1.2.3.

In 1030, the message sending terminal builds a context based on the global transaction ID.

In 1040, the message sending terminal executes a local transaction in the context.

In 1050, the message sending terminal sends a message to a message receiving terminal after completing execution of the local transaction, the message including the global transaction ID.

FIG. 11 is a data flow diagram of yet another embodiment of a process for processing transactions. In some embodiments, system 1100 comprises: a message sending terminal and a message receiving terminal of a message link and a transaction coordinator used to coordinate message link-level transactions. The message receiving terminal can be used to execute the processing of the transaction process 400 of FIG. 4.

In 1110, the message receiving terminal receives, from a message sending terminal, a message including a global transaction identifier (ID). For example the global transaction ID is 321.

In 1120, the message receiving terminal builds a context based on the global transaction ID.

In 1130, the message receiving terminal executes a local transaction in the context.

In 1140, the message receiving terminal sends a global transaction commit request to a transaction coordinator after completing execution of the local transaction, the global transaction commit request instructing that the message link-level transaction be committed.

Figure 5:
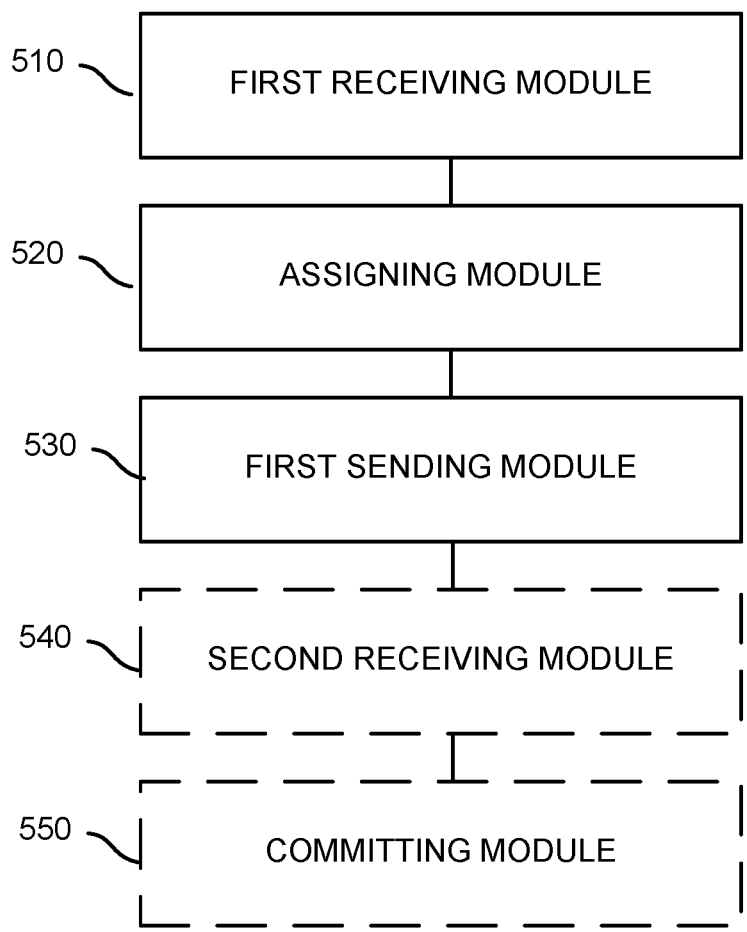
FIG. 5 is a structural diagram of an embodiment of a device for processing transactions.

FIG. 5 is a structural diagram of an embodiment of a device for processing transactions. In some embodiments, the device 500 is configured to implement the process 200 of FIG. 2 and includes: a first receiving module 510, an assigning module 520, and a first sending module 530.

In some embodiments, the first receiving module 510 is configured to receive a global transaction start request sent by a message sending terminal, the global transaction start request instructing that a message link-level transaction be started.

In some embodiments, the assigning module 520 is configured to assign a unique transaction identifier (ID) to the message link-level transaction.

In some embodiments, the first sending module 530 is configured to send back a global transaction ID to the message sending terminal, the global transaction ID including the unique transaction ID and an address of a transaction coordinator, the transaction coordinator being configured to coordinate the message link-level transaction. The address of the transaction coordinator can include an IP address, a port number, etc.

In some embodiments, in the event that the message sending terminal initiates a message link-level transaction, the message sending terminal first sends a global transaction start request to the transaction coordinator. After the first receiving module 510 receives the global transaction start request, the assigning module 520 assigns a unique transaction ID to the message link-level transaction to differentiate the message link-level transaction from other transactions. The first sending module 530 combines the unique transaction ID and the address (e.g., IP address, port number, etc.) of the transaction coordinator configured to coordinate the message link-level transaction to form a global transaction ID (XID) and sends the global transaction ID to the message sending terminal. The receiving of the global transaction ID causes the message sending terminal to build a context based on the global transaction ID and execute a local transaction in the context. In the context, a resource manager of the message sending terminal performs operations on the local database and, interacting with the transaction coordinator based on information in the context, is coordinated by the transaction coordinator. After completing the local transaction, the message sending terminal adds the global transaction ID to a header of a message to be sent and then sends the message to the message receiving terminal. The message receiving terminal re-builds the context based on the global transaction ID included in the received message and executes a local transaction in the same context. A resource manager of the message receiving terminal performs operations on the local database.

In some embodiments, the device 500 further includes: a second receiving module 540 and a committing module 550.

In some embodiments, the second receiving module 540 is configured to receive a global transaction commit request from the message receiving terminal.

In some embodiments, the committing module 550 is configured to commit the message link-level transaction to servers of the message sending terminal and the message receiving terminal, respectively, in the event that the second receiving module 540 receives the global transaction commit request.

After completing execution of the local transaction, the message receiving terminal sends, to the transaction coordinator, a global transaction commit request, the global transaction commit request instructing that the message link-level transaction be committed to the servers of the message sending terminal and the message receiving terminal, respectively. The message sending terminal or the message receiving terminal sends a global transaction roll-back request to the transaction coordinator in the event that the execution of the local transaction fails. The global transaction roll-back request instructs the transaction coordinator to send a global transaction roll-back request to the servers of the message sending terminal and the message receiving terminal, respectively. As a result, each server rolls back to the status prior to the start of the message link-level transaction.

The device 500 processes a local transaction at each terminal of a message link as a single global transaction by including a global transaction ID in the message and thus automatically propagating a context. In the event that the transaction fails on any terminal, the device 500 rolls back the global transaction, and the transaction of each terminal is rolled back to the status prior to the transaction, thereby ensuring data consistency over the entire link, avoiding unnecessary manual intervention, and lowering the costs of development, operations, and maintenance.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Figure 6:
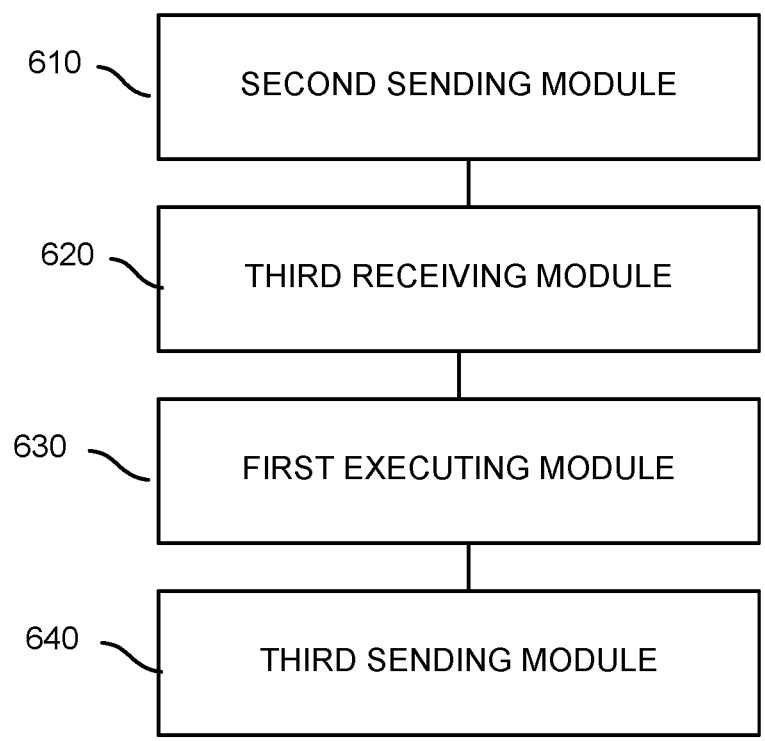
FIG. 6 is a structural diagram of another embodiment of a device for processing transactions.

FIG. 6 is a structural diagram of another embodiment of a device for processing transactions. In some embodiments, the device 600 is configured to implement the process 300 of FIG. 3 and includes: a second sending module 610, a third receiving module 620, a first executing module 630, and a third sending module 640.

In some embodiments, the second sending module 610 is configured to send a global transaction start request to a transaction coordinator, the global transaction start request instructing that a message link-level transaction be started.

In some embodiments, the third receiving module 620 is configured to receive a global transaction identifier (ID) sent back by the transaction coordinator, the global transaction ID including a unique transaction ID assigned to the message link-level transaction and an address of the transaction coordinator configured to coordinate the message link-level transaction. The address of the transaction coordinator can include an IP address, a port number, etc.

In some embodiments, the first executing module 630 is configured to build a context based on the global transaction ID and execute a local transaction in the context.

In some embodiments, the third sending module 640 is configured to send a message to a message receiving terminal after executing the local transaction, the message including the global transaction ID.

In the event that the message sending terminal begins a transaction, the second sending module 610 first sends a global transaction start request to the transaction coordinator. After the third receiving module 620 receives the global transaction ID sent back by the transaction coordinator, the first executing module 630 builds a context based on the global transaction ID and executes a local transaction in this context. In the context, a resource manager for the message sending terminal performs operations on the local database and, interacting with the transaction coordinator based on information in the context, is coordinated by the transaction coordinator. After the first executing module 630 completes the local transaction, the third sending module 640 adds the global transaction ID to a header of a message to be sent and then sends the message to the message receiving terminal. The message receiving terminal re-builds the context based on the global transaction ID included in the received message and executes a local transaction in the context. A resource manager of the message receiving terminal performs operations on the local database.

In addition, in the event that execution of a local transaction at the message sending terminal fails, a global transaction roll-back request is sent to the transaction coordinator. The transaction coordinator sends the global transaction roll-back request to all servers participating in the global transaction (message link-level transaction). The sending of the global transaction roll-back request can include servers of the message sending terminal, the message receiving terminal, and a message intermediate terminal (in the event that the message intermediate terminal exists). Upon receiving the global transaction roll-back request, each server rolls back to the status prior to the start of the message link-level transaction.

The device 600 processes a local transaction at each terminal of a message link as a single global transaction by including a global transaction ID in a message and thus automatically propagating a context. In the event that the transaction fails on any terminal, the device 600 rolls back the global transaction, and the transaction of each terminal is rolled back to the status prior to the transaction, thereby ensuring data consistency over the entire link, avoiding unnecessary manual intervention, and lowering the costs of development, operations, and maintenance.

Figure 7:
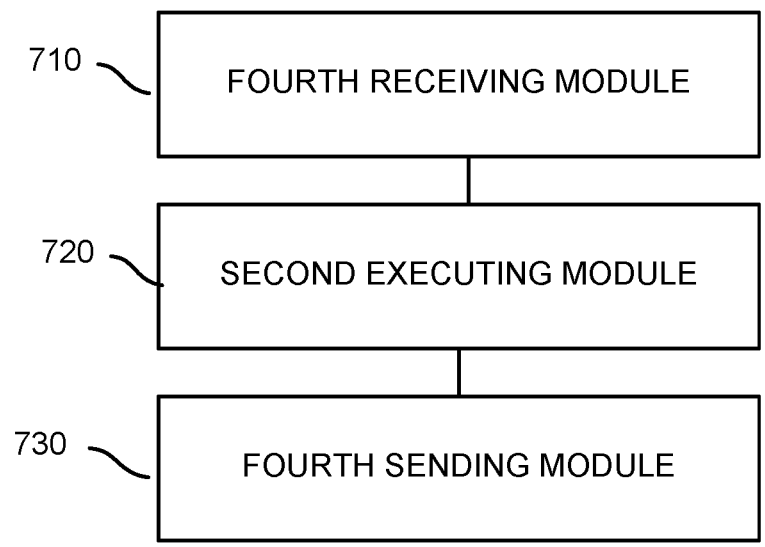
FIG. 7 is a structural diagram of yet another embodiment of a device for processing transactions.

FIG. 7 is a structural diagram of yet another embodiment of a device for processing transactions. In some embodiments, the device 700 is configured to implement the process 400 of FIG. 4 and includes: a fourth receiving module 710, a second executing module 720, and a fourth sending module 730.

In some embodiments, the fourth receiving module 710 is configured to receive a message including a global transaction identifier (ID) from a message sending terminal, the global transaction ID including a unique transaction ID assigned to a message link-level transaction and an address of a transaction coordinator configured to coordinate the message link-level transaction. The address of the transaction coordinator can include an IP address, a port number, etc.

In some embodiments, the second executing module 720 is configured to build a context based on the global transaction ID, and execute a local transaction in the context.

In some embodiments, the fourth sending module 730 is configured to send a global transaction commit request to the transaction coordinator after the execution of the local transaction, the global transaction commit request instructing that the message link-level transaction be committed.

After completing the local transaction, the message sending terminal adds the global transaction ID to a header of the message to be sent and then sends the message to the message receiving terminal.

In some embodiments, the fourth receiving module 710 receives the message including the global transaction ID from the message sending terminal. The second executing module 720 re-builds the context based on the global transaction ID included in the received message and executes a local transaction in the context. A resource manager of the device 700 performs operations on the local database. After the second executing module 720 completes execution of the local transaction, the fourth sending module 730 sends a global transaction commit request to the transaction coordinator instructing the transaction coordinator to commit the message link-level transaction to servers of the message sending terminal and the message receiving terminal, respectively.

In addition, in the event that execution of a local transaction at the message receiving terminal fails, a global transaction roll-back request is sent to the transaction coordinator. The transaction coordinator sends the global transaction roll-back request to all servers participating in the global transaction (the message link-level transaction). The servers can include the servers of the message sending terminal, the message receiving terminal, and a message intermediate terminal (in the event that the message intermediate terminal exists). Upon receiving the global transaction roll-back request, each server rolls back to the status prior to the start of the message link-level transaction.

The device 700 processes a local transaction at each terminal of a message link as a single global transaction by including the global transaction ID in the message and thus automatically propagating the context. In the event that the transaction fails on any terminal, a transaction rolls back the global transaction, and the transaction of each terminal is rolled back to the status prior to the transaction, thereby ensuring data consistency over the entire link, avoiding unnecessary manual intervention, and lowering the costs of development, operations, and maintenance.

Figure 8:
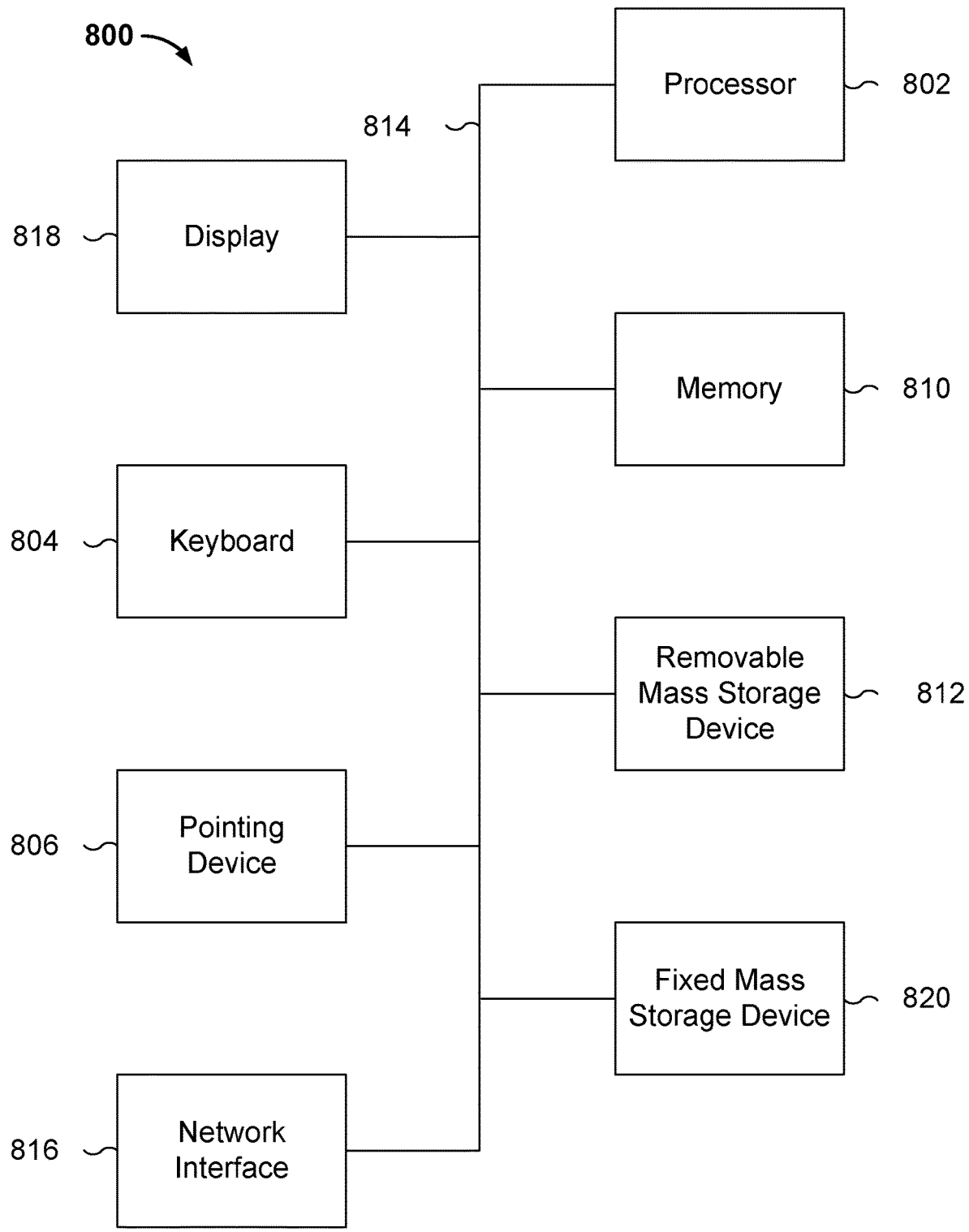
FIG. 8 is a functional diagram illustrating a programmed computer system for processing transactions in accordance with some embodiments.

FIG. 8 is a functional diagram illustrating a programmed computer system for processing transactions in accordance with some embodiments. As will be apparent, other computer system architectures and configurations can be used to process transactions. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data and objects used by the processor 802 to perform its functions (e.g., programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storages 812 and 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing transactions received from a message sending terminal for a message receiving terminal via a control module that coupled to a plurality of transaction coordinators, comprising:
   receiving, by the control module, a global transaction start request from the message sending terminal, the global transaction start request instructing a message link-level transaction be started;
   assigning, by the control module, to the message link-level transaction, a transaction coordinator from the plurality of transaction coordinators to coordinate the message link-level transaction;
   forwarding, by the control module, the global transaction start request to the transaction coordinator, wherein:
   the transaction coordinator is configured to:
      receive the global transaction start request;
      assign a unique transaction ID to the message link-level transaction; and
      send a global transaction ID to the message sending terminal, the global transaction ID including the unique transaction ID and an address of the transaction coordinator;
   the message sending terminal is configured to:
      receive the global transaction identifier (ID) sent by the transaction coordinator for the message link-level transaction,
      build a first context based on the global transaction ID;
      execute a local transaction in the first context; and
      after completing execution of the local transaction in the first context, send a message to a message receiving terminal, the message including the global transaction ID;
   the message receiving terminal is configured to:
      receive the message including the global transaction ID from the message sending terminal;
      build a second context based on the global transaction ID;
      execute a local transaction in the second context; and
      send a global transaction commit request to the transaction coordinator upon completing execution of the local transaction in the second context; and
   the transaction coordinator is further configured to:
      receive the global transaction commit request sent by the message receiving terminal; and
      commit the message link-level transaction to servers of the message sending terminal and the message receiving terminal, respectively, upon the receiving of the global transaction commit request sent by the message receiving terminal.

2. The method as described in claim 1, further comprising:
   upon receiving a global transaction roll-back request sent by the message sending terminal or the message receiving terminal, sending the global transaction roll-back request to servers of the message sending terminal and the message receiving terminal, respectively, the global transaction roll-back request rolling back the message link-level transaction.

3. The method as described in claim 1, wherein the sending of the message to the message receiving terminal comprises:
   sending the message to message-oriented middleware, the message-oriented middleware being configured to store and forward the message.

4. The method as described in claim 1, further comprising:
   sending a global transaction roll-back request to the transaction coordinator in the event that execution of the local transaction fails, the global transaction roll-back request rolling back the message link-level transaction.

5. The method as described in claim 1, wherein the receiving of the message including the global transaction identifier (ID) from the message sending terminal comprises:
   sending a message acquisition request to message-oriented middleware; and
   receiving the message, the message being stored in the message-oriented middleware, originating from the message sending terminal, and including the global transaction ID.

6. The method as described in claim 1, further comprising:
   sending a global transaction roll-back request to the transaction coordinator in the event that execution of the local transaction fails, the global transaction roll-back request rolling back the message link-level transaction.

7. A system for processing transactions received from a message sending terminal for a message receiving terminal via a control module that coupled to a plurality of transaction coordinators, comprising:
   a first processor; and
   a first memory coupled with the first processor, wherein the first memory is configured to provide the first processor with instructions which when executed cause the first processor to:
      receive a global transaction start request from the message sending terminal, the global transaction start request instructing a message link-level transaction be started;

assign to the message link-level transaction, a transaction coordinator from the plurality of transaction coordinators to coordinate the message link-level transaction;

forward the global transaction start request to the transaction coordinator, wherein:

the transaction coordinator, comprising:
a second processor; and
a second memory coupled with the second processor, wherein the second memory is configured to provide the second processor with instructions which when executed cause the second processor to:
receive the global transaction start request;
assign a unique transaction ID to the message link-level transaction; and
send a global transaction ID to the message sending terminal, the global transaction ID including the unique transaction ID and an address of the transaction coordinator;

the message sending terminal, comprising:
a third processor; and
a third memory coupled with the third processor, wherein the third memory is configured to provide the third processor with instructions which when executed cause the third processor to:
receive the global transaction identifier (ID) sent by the transaction coordinator for the message link-level transaction,
build a first context based on the global transaction ID;
execute a local transaction in the first context; and
after completing execution of the local transaction in the first context, send a message to a message receiving terminal, the message including the global transaction ID;

the message receiving terminal, comprising:
a fourth processor; and
a fourth memory coupled with the fourth processor, wherein the fourth memory is configured to provide the fourth processor with instructions which when executed cause the fourth processor to:
receive the message including the global transaction identifier (ID) from the message sending terminal;
build a second context based on the global transaction ID;
execute a local transaction in the second context; and
send a global transaction commit request to the transaction coordinator upon completing execution of the local transaction in the second context; and the transaction coordinator is further configured to:
receive the global transaction commit request sent by the message receiving terminal; and
commit the message link-level transaction to servers of the message sending terminal and the message receiving terminal, respectively, upon the receiving of the global transaction commit request sent by the message receiving terminal.

8. The system as described in claim 7, wherein the processor is further configured to:
upon receiving a global transaction roll-back request sent by the message sending terminal or a message receiving terminal, send the global transaction roll-back request to servers of the message sending terminal and the message receiving terminal, respectively, the global transaction roll-back request rolling back the message link-level transaction.

9. A computer program product for processing transactions received from a message sending terminal for a message receiving terminal via a control module that coupled to a plurality of transaction coordinators, being embodied in a tangible non-transitory computer readable storage medium, and comprising computer instructions for:

receiving, by the control module, a global transaction start request from the message sending terminal, the global transaction start request instructing a message link-level transaction be started;

assigning, by the control module, to the message link-level transaction, a transaction coordinator from the plurality of transaction coordinators to coordinate the message link-level transaction;

forwarding, by the control module, the global transaction start request to the transaction coordinator, wherein:

the transaction coordinator is configured to:
receive the global transaction start request;
assign a unique transaction ID to the message link-level transaction; and
send a global transaction ID to the message sending terminal, the global transaction ID including the unique transaction ID and an address of the transaction coordinator;

the message sending terminal is configured to:
receive the global transaction identifier (ID) sent by the transaction coordinator for the message link-level transaction, the global transaction ID including the unique transaction ID assigned to the message link-level transaction and the address of the transaction coordinator;
build a first context based on the global transaction ID;
execute a local transaction in the first context; and
after completing execution of the local transaction in the first context, send a message to a message receiving terminal, the message including the global transaction ID;

the message receiving terminal is configured to:
receive the message including the global transaction identifier (ID) from the message sending terminal;
build a second context based on the global transaction ID;
execute a local transaction in the second context; and
send a global transaction commit request to the transaction coordinator upon completing execution of the local transaction in the second context; and the transaction coordinator is further configured to:
receive the global transaction commit request sent by the message receiving terminal; and
commit the message link-level transaction to servers of the message sending terminal and the message receiving terminal, respectively, upon the receiving of the global transaction commit request sent by the message receiving terminal.

10. The computer program product as described in claim 9, further comprising computer instructions for:
upon receiving a global transaction roll-back request sent by the message sending terminal or a message receiving terminal, sending the global transaction roll-back request to servers of the message sending terminal and the message receiving terminal, respectively, the global transaction roll-back request rolling back the message link-level transaction.

\* \* \* \* \*

UNITED STATES PATENT AND TRADEMARK OFFICE
CERTIFICATE OF CORRECTION

PATENT NO. : 11,256,536 B2
APPLICATION NO. : 16/802186
DATED : February 22, 2022
INVENTOR(S) : Yu Jiang It is certified that error appears in the above-identified patent and that said Letters Patent is hereby corrected as shown below:

On the Title Page

Item [30], insert --September 05, 2017 (CN) ………….. 201710792273.8--.
Above item [74], delete "Jujia Xu", and insert --Zujia Xu--, therefor.

Signed and Sealed this
Eleventh Day of October, 2022

Katherine Kelly Vidal
*Director of the United States Patent and Trademark Office*